United States Patent [19]

Shenoy

[11] Patent Number: 4,655,809

[45] Date of Patent: Apr. 7, 1987

[54] AIR SEPARATION PROCESS WITH SINGLE DISTILLATION COLUMN WITH SEGREGATED HEAT PUMP CYCLE

[75] Inventor: Thirthahalli A. Shenoy, Whitehall, Pa.

[73] Assignee: Air Products and Chemicals, Inc., Allentown, Pa.

[21] Appl. No.: 818,416

[22] Filed: Jan. 10, 1986

[51] Int. Cl.$^4$ ................................................. F25J 3/00
[52] U.S. Cl. .......................................... 62/18; 62/39; 62/42
[58] Field of Search .................... 62/32, 36, 38, 39, 42, 62/18

[56] References Cited

U.S. PATENT DOCUMENTS

| | | | |
|---|---|---|---|
| 3,214,926 | 11/1965 | Shaievitz et al. | 62/14 |
| 3,217,502 | 11/1965 | Keith | 62/13 |
| 3,394,555 | 7/1968 | LaFleur | 62/40 |
| 3,731,495 | 5/1973 | Coveney | 62/39 |
| 4,099,945 | 7/1978 | Skolaude | 62/38 |
| 4,224,045 | 9/1980 | Olszewski et al. | 62/30 |
| 4,382,366 | 5/1983 | Gaumer | 62/31 |
| 4,400,188 | 8/1983 | Patel et al. | 62/39 |
| 4,444,577 | 4/1984 | Perez | 62/39 |
| 4,543,115 | 9/1985 | Agrawal et al. | 62/38 |
| 4,555,256 | 11/1985 | Skolaude | 62/38 |
| 4,566,887 | 1/1986 | Openshaw | 62/38 |

Primary Examiner—Ronald C. Capossela
Attorney, Agent, or Firm—Willard Jones, II; James C. Simmons; E. Eugene Innis

[57] ABSTRACT

The present invention is directed to an air separation system for the recovery of pressurized, substantially pure oxygen gas. The system uses a single pressure distillation column and utilizes the nitrogen product stream to provide power for feed air compression, segregated heat pump fluid compression, and electric generation. The system utilizes a segregated heat pump cycle which provides heat exchange for both column reboil and reflux.

12 Claims, 1 Drawing Figure

AIR SEPARATION PROCESS WITH SINGLE DISTILLATION COLUMN WITH SEGREGATED HEAT PUMP CYCLE

TECHNICAL FIELD

The present invention is directed to the separation of air into a substantially pure oxygen product stream and a nitrogen product stream. The invention also relates to the use of the nitrogen stream as secondary cooling gas for a combuster, the exhaust gas of which when fed to a gas turbine can provide air feed compression energy or electricity for export or process operation when a generator is attached to the turbine. The invention also relates to a single pressure distillation column separation of air in order to obtain an oxygen product stream which utilizes a segregated heat pump cycle to control column reboil and reflux.

BACKGROUND OF THE PRIOR ART

Various processes have been known and utilized in the prior art for the separation of air into its nitrogen and oxygen dominant constituents. Additionally, the use of a single pressure distillation column is known to have been used in the prior art for such separations.

In U.S. Pat. No. 3,214,926 a method for producing liquid oxygen or liquid nitrogen is set forth. However, in the patent it is necessary to have two distillation columns, one at high pressure and another at low pressure in order to extract liquid oxygen.

In U.S. Pat. No. 3,217,502 a system is described which utilizes a single pressure distillation column. The product of this air separation system is liquid nitrogen. Oxygen which is separated out in this system is vented to waste. In this patent, it is the oxygen waste stream which is expanded in order to provide refrigeration for the air separation system.

An air separation unit for the production of oxygen is disclosed in U.S. Pat. No. 3,394,555 wherein the combustion of a separate fuel source such as powdered coal is burned with oxygen or an air-oxygen mixture in which the oxygen is derived from the air separation unit. This combustion process provided power for the compression of helium gas for refrigeration necessary to the cryogenic separation system. Power from such combustion is derived from a magnetohydrodynamic power generator.

U.S. Pat. No. 3,731,495 discloses an air separation system using an air feed compressor which is powered by combustion gases directed through a turbine. The turbine exhaust heats boiler steam to supplement the compressor drive. Electric generation is also considered. In addition, this reference utilizes two separate columns at separate pressures for the recovery of the individual gaseous components of air which are separated.

U.S. Pat. No. 4,224,045 is directed towards a process where oxygen is produced by distillation of liquefied air in a two column unit. A gas turbine, powered in part by a nitrogen product stream, supplies the energy to compress the feed air.

U.S. Pat. No. 4,382,366 is directed to an air separation system for the recovery of pressurized, substantially pure oxygen gas. The system uses a single pressure distillation column and burns a nitrogen-oxygen waste stream to provide power for the air compressor, the oxygen product compressor and electric generation. The distillation column has a split feed to develop reflux and reboil and to provide initial separation of the liquid and vapor components of the column.

The art as represented above has failed to disclose an efficient manner in which to separate oxygen from air with the utilization of the by-products or waste streams in order to recycle energy necessary for compression both of the feed air and the segregated heat pump fluid. In addition, the prior art has failed to minimize capital expenditures in separating air by the utilization of a single pressure distillation column. The solution to problems such as these are the objectives of the present invention.

BRIEF SUMMARY OF THE INVENTION

The present invention is directed to a process for separating high purity oxygen from air in a single pressure distillation column comprising the steps of: compressing an air feed stream, unless the air feed is already compressed; removing water and carbon dioxide from the air feed stream, preferably in a molecular sieve unit; cooling the air feed stream; introducing the air feed stream into an intermediate point of the column; heat exchanging the liquid phase of the bottom of the column with the segregated heat pump fluid to at least partially condense said fluid and reboil the liquid phase; heat exchanging the segregated heat pump fluid against the nitrogen product stream and the segregated heat pump fluid after expansion and exchange in a condenser of the column; expanding the segregated heat pump fluid; heat exchanging the gaseous phase of the top of the column against the expanded segregated heat pump fluid to control reflux of the column; recycling the segregated heat pump fluid wherein said fluid stream is compressed, then the fluid stream is split, the smaller fraction of the fluid stream is expanded in a turbine to provide some refrigeration and is then recycled back to the heat pump compressor, and the remaining bulk of the fluid stream is heat exchanged and charged to the reboiler of the column; removing, at pressure, a nitrogen product stream from the top of the column as the overhead product stream; optionally, utilizing the nitrogen product stream as secondary cooling air for quenching of a combuster, the exit gas of which drives a gas turbine, which provides the power for the compression and electricity when attached to a generator; and removing, at pressure, an oxygen product stream from the bottom of the column.

BRIEF DESCRIPTION OF THE DRAWING

The single FIGURE of the drawing consists of a flow sheet of the present invention which is an air separation unit which provides substantially pure oxygen product.

DETAILED DESCRIPTION OF THE INVENTION

Figure 1:
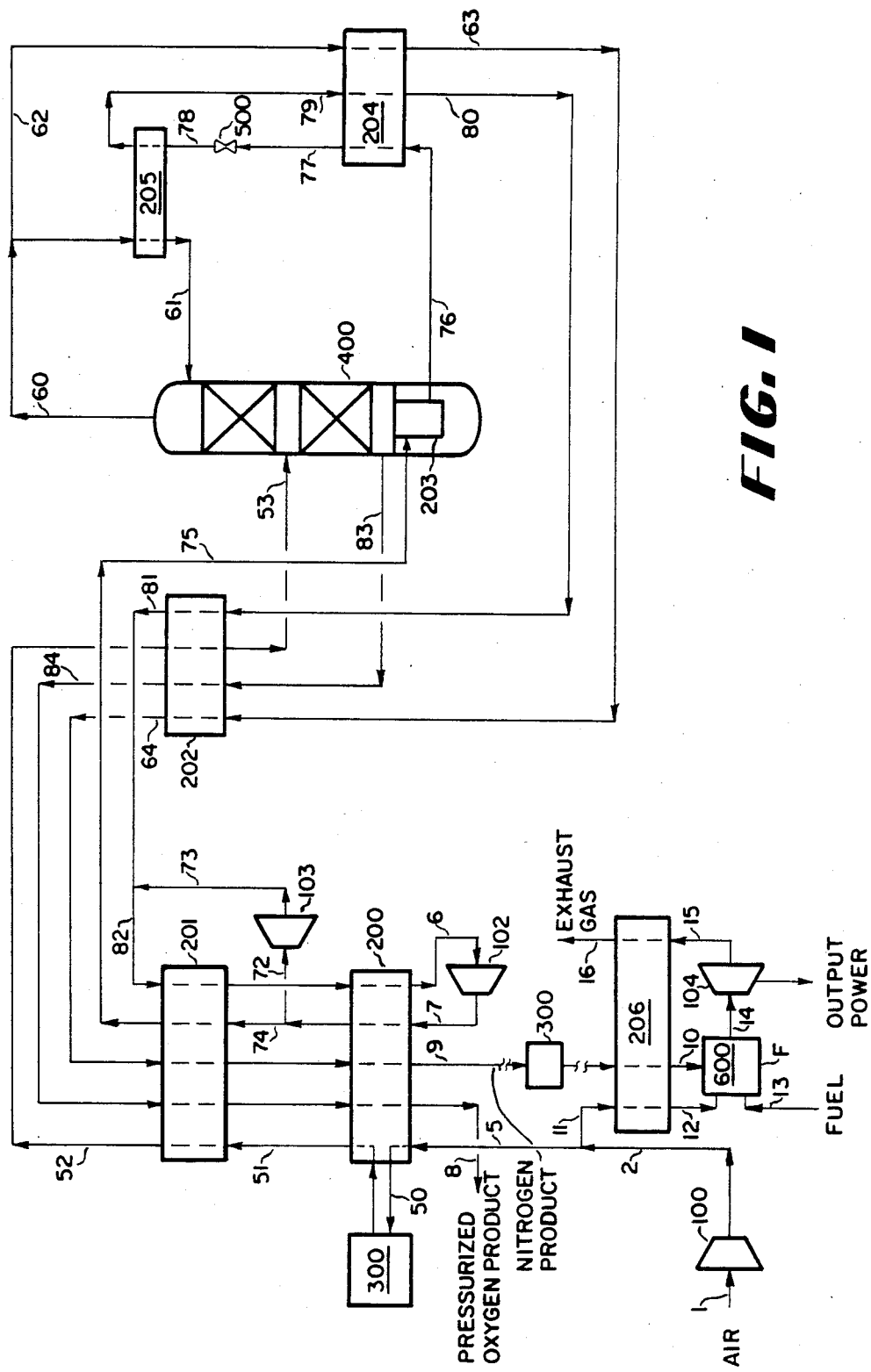

With reference to the drawing the cryogenic oxygen generator is shown with a single pressure distillation column having a segregated heat pump cycle. Air, stream 1, is fed to a compressor, unit 100, the exhaust from this compressor, stream 2, is split with a portion of the air being fed for separation, stream 5, and the remainer of the air, stream 11, being heat exchanged and fed with a fuel to a combuster, unit 600. Air feed stream 5, which has been compressed, is cooled partly in a heat exchanger, unit 200, sent to the molecular sieve unit, unit 300, for removal of water and carbon dioxide and returned as stream 51 for further cooling in unit 200 against warming product streams. The feed air is then further cooled in heat exchangers, units 200, 201, and 202, to about its dew point and fed as stream 53 to the fractionation column, unit 400. A top column vapor, stream 60, is put through a partial condenser, unit 205, to provide a liquid reflux, stream 61, for the column. The product vapor, stream 62, rich in nitrogen, hereafter called the nitrogen product stream, is rewarmed in a heat exchanger, unit 204, by subcooling a heat pump fluid. The rewarmed vapor is further warmed to ambient in units 202, 201, and 200 and exits as a pressurized nitrogen product stream, stream 9. The pressurized nitrogen product stream, stream 9, being water and carbon dioxide free and at a pressure below that of stream 50 is an ideal stream to use in whole or in part for the regeneration of the molecular sieve unit. Whether utilized to regenerate the molecular sieve unit or not, the pressurized nitrogen product stream is used as secondary cooling air for a combuster, the exit gas from the combuster, which includes the nitrogen product stream, is used to drive a gas turbine which provides power to compress the air feed stream and the segregated heat pump fluid and can also supply for the export of electrical energy when connected to a generator.

The bottom oxygen product stream, stream 83, from the column is rewarmed in units 202, 201, and 200 by heat exchange against warm feed air and heat pump fluid, to ambient temperature and exits as a pressurized oxygen product, stream 8, of requisite purity and flow. In order to enable the separation of the feed air, stream 5, into the products as described above, a heat pump circuit, that provides refrigeration, is necessary. The fluid used in this heat pump cycle can be any gas, however, argon is the preferred fluid embodiment. The pressurized heat pump fluid, stream 7, is cooled in unit 200 and split into two streams. The smaller fraction, stream 72, is expanded in a turbine, unit 103, to provide some refrigeration for the cycle. The bulk of the cooling heat pump fluid, stream 74, is further cooled in heat exchange units 201 and 202 and then fed to the column reboiler, unit 203. While providing reboil heat, the heat pump fluid is partially or completely liquefied and leaves unit 203 as a saturated liquid, stream 76. This stream is subcooled in unit 204 and expanded by throttle valve, unit 500. This stream, stream 78, is then used to run the column condenser, unit 205, by reboiling it in the condenser to extract heat from the condensing top vapor. After complete vaporization in unit 205, the heat pump fluid is rewarmed in units 204 and 202. The fluid from 202, stream 81, is mixed with turbine exhaust vapors, stream 73, and rewarmed to ambient in heat exchange units 201 and 200. The ambient heat pump fluid is then pressurized in the heat pump compressor, unit 102.

It is a feature of the present invention to generate oxygen from air in a single pressure column wherein the power requirement of the air compression necessary for the separation of the oxygen is derived from utilizing the nitrogen product stream as secondary cooling air in a combuster, the combuster exist gas feeding to a gas turbine which produces enough power to drive the air feed and segregated heat pump fluid compressors and to provide export power.

It is another feature of this invention to utilize a segregated heat pump cycle to provide a heat exchange medium for both the reboiler and reflux condenser of the column.

It is another feature of the present invention to utilize the nitrogen prduct stream, in whole or in part, to regenerate the molecular sieve unit.

The present invention has been described with reference to a preferred embodiment thereof. However, this embodiment should not be considered a limitation on the scope of the invention, which scope should be ascertained by the following claims.

I claim:

1. In a process for separating high purity pressurized oxygen from air in a pressurized, single distillation column wherein an air feed stream is compressed, water and carbon dioxide are removed from said air feed stream, said air stream is cooled and then introduced into an intermediate point of said distillation column; a gaseous nitrogen product stream is removed, at pressure, from the top of said distillation column as an overhead product stream; and a liquid phase oxygen product is removed, at pressure, from the bottom of the column, the improvement comprising providing reboil and reflux duty for said column with a segregated heat pump cycle comprising:
   (a) compressing a segregated heat pump fluid in a compressor;
   (b) cooling said compressed, segregated heat pump fluid against warming nitrogen and oxygen product streams;
   (c) splitting said cooled, compressed, segregated heat pump fluid into a first portion and a second portion;
   (d) heat exchanging said first portion against the liquid phase of the bottom of the distillation column to at least partially condense said first portion and reboil the liquid phase;
   (e) cooling said partially condensed first portion against the warming nitrogen product stream;
   (f) expanding the cooled, partially condensed first portion;
   (g) heat exchanging the expanded, cooled, partially condensed first portion against the overhead of the distillation column to control the reflux of the column;
   (h) heat exchanging said first portion from step (g) to recover refrigeration value;
   (i) expanding said second portion generated in step (c);
   (j) combining said first portion from step (h) and said expanded second portion to form a combined segregated heat pump compressor feed;
   (k) heat exchanging said combined segregated heat pump compressor feed to recover refrigeration value; and
   (l) feeding said combined compressor feed from step (k) to the compressor of step (a).

2. The process of claim 1 which further comprises the step of: utilizing the nitrogen product stream as secondary cooling air for quenching of a combuster, the exit gas of which drives a gas turbine, which provides the power for the compression.

3. The process of claim 2 wherein the segregated heat pump fluid is argon.

4. The process of claim 3 wherein the gas turbine drives the compressors and a generator for production of electrical power for export or process requirements.

5. The process of claim 2 wherein the removal of water and carbon dioxide is carried out in a molecular sieve unit.

6. The process of claim 5 wherein at least part of the nitrogen product stream is passed through the molecular sieve unit to regenerate the molecular sieve unit prior to being fed to the combuster.

7. The process of claim 6 wherein the gas turbine drives the compressors and a generator for production of electrical power for export or process requirements.

8. The process of claim 5 wherein the gas turbine drives the compressors and a generator for production of electrical power for export or process requirements.

9. The process of claim 2 wherein the gas turbine drives the compressors and a generator for production of electrical power for export or process requirements.

10. The process of claim 1 wherein the segregated heat pump fluid is argon.

11. The process of claim 1 wherein the removal of water and carbon dioxide is carried out in a molecular sieve unit.

12. The process of claim 11 wherein at least part of the nitrogen product stream is passed through the molecular sieve unit to regenerate the molecular sieve unit.

* * * * *